United States Patent [19]

Khanmamedov

[11] Patent Number: 5,716,587

[45] Date of Patent: Feb. 10, 1998

[54] APPARATUS FOR REMOVAL OF CONTAMINATES FROM A GAS STREAM

[76] Inventor: Tofik Khanmamedov, 2321 N. Court, Garland, Tex. 75044

[21] Appl. No.: 670,796

[22] Filed: Jun. 21, 1996

Related U.S. Application Data

[63] Continuation of Ser. No. 333,649, Nov. 3, 1994, abandoned.

[51] Int. Cl.$^6$ .................................................... B01D 50/00
[52] U.S. Cl. .......................... 422/168; 422/169; 422/178; 423/220; 423/228; 423/230; 423/233; 423/242.2; 423/243.01; 423/244.01; 95/136; 95/139; 96/143; 96/144
[58] Field of Search .................................... 422/168, 234, 422/280, 169, 178; 423/220, 224, 228, 230, 233, 242.2, 242.7, 243.01, 244.01, 244.05; 95/136, 139; 96/143, 144

[56] References Cited

U.S. PATENT DOCUMENTS

| | | | |
|---|---|---|---|
| 4,001,386 | 1/1977 | Klein et al. | 423/574 L |
| 4,153,674 | 5/1979 | Verloop et al. | 423/573 R |
| 4,210,627 | 7/1980 | Verloop et al. | 423/220 |
| 4,263,270 | 4/1981 | Groenen et al. | 423/573 R |
| 4,483,834 | 11/1984 | Wood | 423/228 |
| 4,889,700 | 12/1989 | Elgue et al. | 423/220 |
| 5,397,556 | 3/1995 | Towler et al. | 423/220 |
| 5,422,086 | 6/1995 | Bowman | 423/220 |
| 5,458,861 | 10/1995 | Buchanan et al. | 423/244.1 |

*Primary Examiner*—Christopher Kim
*Attorney, Agent, or Firm*—Jeffrey T. Hubbard; H. Dennis Kelly; Timmons & Kelly

[57] ABSTRACT

An apparatus is disclosed for removal of contaminate(s) from a gas stream in an oil or gas refinery using an absorber-regenerator process wherein a portion of the contaminate rich overhead gas from the regenerator is utilized to increase the partial pressure of the contaminate at the absorber so as to enhance selective absorption of the contaminate(s).

9 Claims, 3 Drawing Sheets

APPARATUS FOR REMOVAL OF CONTAMINATES FROM A GAS STREAM

This application is a continuation of application Ser. No. 08/333,649, filed Nov. 3, 1994, now abandoned.

TECHNICAL FIELD

This invention relates to the solvent absorption-regeneration process for removal of hydrogen sulfide and/or carbon dioxide contaminates from sour gas feedstocks and tail gases, as commonly used in cooperation with sulfur recovery plants, and particularly, to increased partial pressure of the contaminate in a feed gas for greater selectivity of the absorption-regeneration process.

BACKGROUND OF THE INVENTION

Hydrocarbon fuel sources such as crude oil, natural gas and coal are often contaminated by a significant content of sulfur and/or carbon dioxide. The sulfur is environmentally objectionable if released into the atmosphere and must be extracted in the refining process so that the fuel can be used. The extraction of sulfur, generally present in the form of hydrogen sulfide, and carbon dioxide from feedstocks and tail gases is thus, a vital aspect of refinery, natural gas and coal liquification operations.

Hydrogen sulfide is usually extracted by a process of absorption and stripping. A solvent which is selective for hydrogen sulfide, particularly in the presence of carbon dioxide, is required, with an absorption capacity that is temperature dependent to facilitate stripping. Aqueous solutions of secondary and tertiary amine such as, diisopropylamine (DIPA), methyldiethanolamine (MDEA) or triethanolamine (TEA) are appropriate for this process and are commonly used. The feedstock gas is mixed with the amine at relatively low temperatures in an absorbing vessel to absorb out the hydrogen sulfide. This step produces a "rich" amine stream, loaded with $H_2S$ and $CO_2$, which is passed to a stripper (regenerating vessel), generally in the form of a tray type column. Here it is heated, producing acid gas and a lean amine stream. The lean amine stream is recycled to the absorbing vessel and the acid gas concentration of $H_2S$, is routed to a sulfur recovery unit to be converted into elemental sulfur by the well known Claus process.

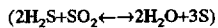

$$(2H_2S+SO_2 \leftrightarrow 2H_2O+3S)$$

Treatment of acid gas feedstocks is discussed in this inventor's co-pending patent application entitled "METHOD AND APPARATUS FOR CONTROLLING THE HYDROGEN SULFIDE CONCENTRATION IN THE ACID GAS FEEDSTOCK OF A SULFUR RECOVERY UNIT", filed Oct. 11, 1994, which is incorporated herein by reference.

The first commercial Shell Claus Off-gas Treating (SCOT) unit to remove sulfur components from Claus plant tail gas to reduce sulfur dioxide emissions was brought on stream in 1973. Since then, the process has been widely accepted in the oil refining and natural gas industries and more than 150 units have been constructed all over the world. Most of these plants are designed and operated in accordance with the basic concept.

In the standard SCOT process, sulfur components in Claus plant tail gas are catalytically converted into hydrogen sulfide. After cooling, the hydrogen sulfide is selectively absorbed from the tail gas by means on an amine solvent. In a regenerating vessel, the hydrogen sulfide is desorbed from the solvent and recycled to the Claus plant. The SCOT off-gas is incinerated.

The advantage of the SCOT process is the use of technologies which are familiar to plant operators. Application of the SCOT process at different locations and for different types of gas treating units and Claus units requires in the design. The sulfur dioxide emissions from the Claus and tail gas treating plants make a significant contribution to the total sulfur dioxide emissions from a refinery. It is therefore important to reduce the sulfur dioxide emissions from these plants to the lowest possible levels.

The standard SCOT process is able to easily meet 250 ppmv total sulfur in the SCOT off-gas which corresponds to a total sulfur recovery of 99.9%. In recent years, the demand for higher sulfur recovery efficiencies has provided an incentive to improve the SCOT process. The objective is to lower the total sulfur content in the off-gas from the SCOT absorber to less than 50 ppmv and maintain low operating costs. Accordingly, two new versions of the SCOT process have been developed. These are the Low-sulfur SCOT and the Super-Scot processes.

The Low sulfur-SCOT (LS-SCOT) version is characterized by the use of an inexpensive additive to the amine solvent. This additive improves the regeneration of the solvent to produce a better solvent leanness and thus, a lower off-gas hydrogen sulfide specification. Treated off-gas specifications as low as 10 ppmv hydrogen sulfide or 50 ppmv total sulfur, including COS and $CS_2$, can be met. Because of the additive, LS-SCOT units are preferably designed as a stand-alone SCOT unit. However, the LS-SCOT version has also been tested successfully on integrated SCOT units with DIPA and MDEA solvents.

The performance of an existing standard SCOT unit is likely to be reduced by the number of trays in the absorber and regenerator. However, lower sulfur emissions and/or reduced regeneration energy consumption can be achieved. The performance of an amine regenerator is normally limited by the equilibrium conditions in the bottom. This condition leads to a relation between stripping steam and the solvent leanness. The use of an additive changes the equilibrium conditions; less steam is required for the same leanness, or a greater leanness can be achieved with the same steam rate.

The Super-SCOT version is based on improved stripping by two-stage regeneration and improved absorption by using a lower lean solvent temperature. These two features can be applied separately or in combination.

In order to reach a specific leanness of the solvent (mol $H_2S$/mol amine), a specific steam rate (kg steam/$m^3$ solvent) is required. A leaner solvent will result in a lower hydrogen sulfide concentration in the SCOT off-gas. However, it is not necessary to regenerate the entire solvent flow to this lower leanness level. This consideration has led to two-stage regeneration in which part of the amine solvent flow is more deeply stripped. The super-lean solvent is routed to the top tray of the absorber while the semi-lean solvent enters half-way up the absorber.

It is well known that the solubility of hydrogen sulfide in amine solvents is increased when the temperature is lowered. A lower amine temperature results in a lower hydrogen sulfide partial pressure of the solvent, which enables a lower hydrogen sulfide concentration to be achieved in the SCOT off-gas.

The Super-SCOT version has been developed to achieve a hydrogen sulfide concentration of 10 ppmv $H_2S$ or a total sulfur concentration of less than 50 ppmv and to reduce steam consumption by 30% compared to the standard SCOT unit. Both options have been applied successfully. Cascading the solvent similar to the standard SCOT is an option to save operating costs.

Because the acid gas from the SCOT regenerator is recycled back to the Claus feed gas, it is important that the carbon dioxide concentration in the acid gas is as low as possible in order to avoid $CO_2$ build up via the SCOT recycle and to limit extra throughput in the Claus/SCOT system. Therefore, in principle, the solvent to be selected in the SCOT process should be able to selectively absorb the hydrogen sulfide from the carbon dioxide.

Tail gas from refinery Claus plants normally contains a small percentage of carbon dioxide, so a less selective solvent can be accepted. In refineries, the aqueous DIPA solution is widely applied for hydrogen sulfide and carbonyl sulfide removal from LPG, which makes it attractive to select DIPA in the SCOT process.

In natural gas plants processing sour gases containing a lot of carbon dioxide, the Claus tail gas will contain a considerable amount of carbon dioxide and DIPA, a secondary amine, is not selective enough and should not be applied. Other amines, such as MDEA and Sulfinol M are useful alternatives.

Whether processing feedstock or tail gases, the capacity of the sulfur recovery plant is critical to the capacity for producing finished product. For this reason, there is continuing interest in bettering Claus plant capacities and many incremental improvements have been proposed to the refining industries.

Groenendaal, et al., U.S. Pat. No. 4,263,270, discloses a process for the work-up of hydrogen sulfide containing gases which are normally subjected to Claus process, reduction, absorption and regeneration; the process being characterized by a portion of the feed gases by-passing the Claus unit and being processed in a $CO_2$ selective secondary absorption-regeneration procedure if the stream volume is less than a predetermined quantity.

Verloop, et al., U.S. Pat. No. 4,210,627, discloses a process for increasing the hydrogen sulfide concentration in a gas stream, particularly a gas stream to be fed to a Claus unit. The process is characterized by the measurement of the flow of the gas stream to an absorption system, and in response to such measurement, separation of a portion of the acid gas leaving the regenerator of the system and secondary selective absorption of $H_2S$ in that portion. The loaded secondary absorbent is passed to the regenerator.

Klein, et al., U.S. Pat. No. 4,001,386, discloses a Claus tail gas treatment process characterized by further enriching hydrogen sulfide content of a rich polyalkanoamine solution from absorption, prior to regeneration, by contact with a stream containing hydrogen sulfide at a higher partial pressure than the reduced Claus off gas.

Verloop, et al., U.S. Pat. No. 4,153,674, discloses a Claus process adapted for conversion of feed gas which is high in CO2 and also contains significant amounts of COS and/or organic sulfur compounds by having such fresh feed gas by-pass the Claus unit, to be combined with the Claus off gas ahead of the reduction step.

The foregoing patents, the disclosures of which are incorporated herein by reference for all purposes, attest to the continuing need of greater efficiency and reduced costs for gas contaminate removal.

The object of the present invention is to provide a method and apparatus for achieving an improved efficiency in the solvent absorption-regeneration process and to increase product output, and to do so in a manner which is inexpensively applied to existing installations. Another object is to reduce the capital investment in new installations while improving production capacity.

SUMMARY OF THE INVENTION

In the refinery arts, a solvent absorption and regeneration process is commonly used for the removal of contaminates from a gas mixture. The solvent used must not absorb hydrocarbons to any significant extent while having a marked capacity for absorption of contaminates such as hydrogen sulfide and/or carbon dioxide, carbonyl sulfide and carbon disulfide. Either physical solvents, such as water, propylene carbonate or methyl cyanoacetate, or chemical solvents, such as monoethanol amine (MEA), diethanol amine (DEA) or N-methyl-diethanol amine (MDEA) may be used in such a process. The selectivity of absorption for a contaminate in the treated gas stream will increase with increased partial pressure of the contaminate. Accordingly, in the present invention, a portion of the overhead gas from the regenerator is recycled, to be mixed with the gas stream entering the absorber and thereby increase the partial pressure of the contaminate(s) targeted for absorption-regeneration relative to other components of the stream.

In a tail gas treatment plant for instance, where the hydrogen sulfide rich output stream of the regenerator is returned to the sulfur removal unit and re-processed, the present invention diverts a portion of this $H_2S$ rich return stream and mixes it with the feed gas stream to the absorber. The partial pressure of $H_2S$ in the absorber is thereby elevated with respect to other components, increasing the selectivity of $H_2S$ absorption and causing greater rejection of $CO_2$. Greater rejection of the unselected gases at the absorber results in a lower total mass return flow to the sulfur removal unit without significantly affecting the $H_2S$ return rate. The efficiency of the basic absorption-regeneration process and the overall efficiency of tail gas treatment are improved. Thus, either a smaller, less expensive sulfur removal may be used or a higher level of production may be maintained.

BRIEF DESCRIPTION OF THE DRAWINGS

The aforementioned and other objects and features of the invention will be apparent from the following detailed description of specific embodiments thereof, when read in conjunction with the accompanying drawings, in which.

DETAILED DESCRIPTION OF THE DRAWINGS

Figure 1:
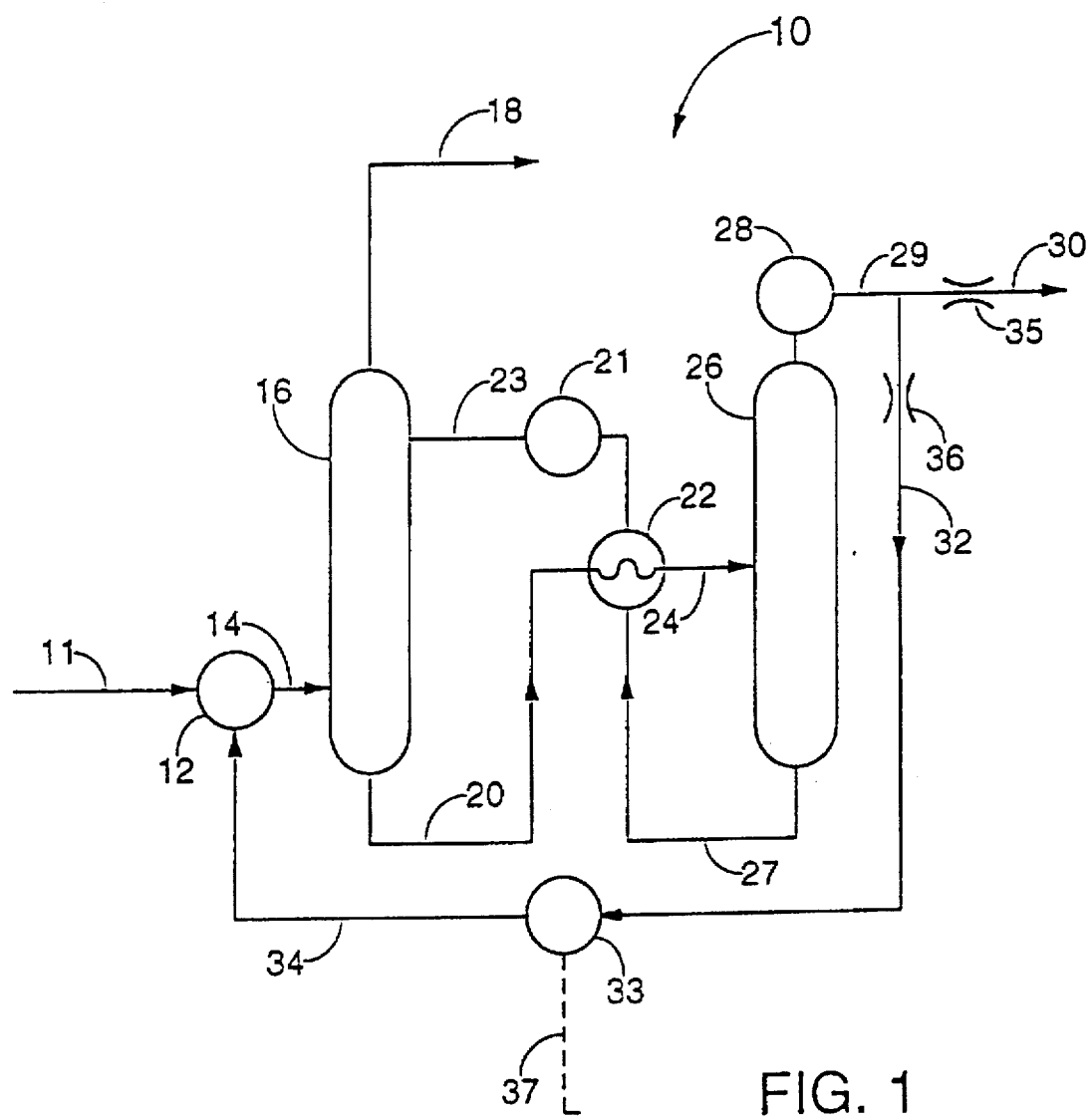
FIG. 1 shows a schematic of a general application of the present invention.

In FIG. 1 is shown a general case absorption-regeneration process 10 where mixer 12 receives gas stream 11 with contaminate(s) such as hydrogen sulfide and/or carbon dioxide, the removal of which is desired. Gas stream 34, which is rich in the contaminate(s) to be removed, is joined into stream 11 by mixer 12 so that the combined gases 14 are fed to absorber 16 with the contaminate partial pressure now significantly increased over that in stream 11. In absorber 16, the contaminate(s) is(are) absorbed by a solvent, the selectivity of which is enhanced by the increased partial pressure of the target contaminate(s) relative to other components. A physical solvent working at relatively high pressure (in the range of 300 psia) my be used for processing natural gas to remove CO2, $H_2S$, COS and $CS_2$, while a chemical solvent would be used for processing oil refinery or coal liquification acid gas or natural gas to selectively absorb H2S and/or CO2 at little more than ambient pressure for the removal of either or both. Residual, unabsorbed gas 18, with minimal target contaminate content, is discharged from the system and target contaminate enriched solvent stream 20 passes through heat exchanger 22 to enter regenerator 26 as heated rich solvent stream 24.

In regenerator 26, heated rich solvent stream 24 gives up the absorbed gases which emerge through cooler 28 as target contaminate rich overhead gas stream 29. Contaminate lean solvent stream 27 is returned to absorber 16 at a reduced temperature as solvent stream 23, after passing through heat exchanger 22 and cooler 21. Overhead gas stream 29 is passed through cooler 28 and divided, with a portion 32 being recycled through absorber 16 as described above, via recycle stream 34 and mixer 12, while the remaining target contaminate rich gas stream 30 is passed to the next process step. Pump 33, controlled by process input signal 37, is required in applications having an inlet pressure at mixer 12 which is higher than the discharge pressure at cooler 28. Otherwise, the respective flow rates of streams 30 and 32 are governed by fixed or variable flow restrictions 35 and 36 which, according to the designer's choice, may be implemented by selective line sizing, flow restrictions or control valves.

Figure 2:
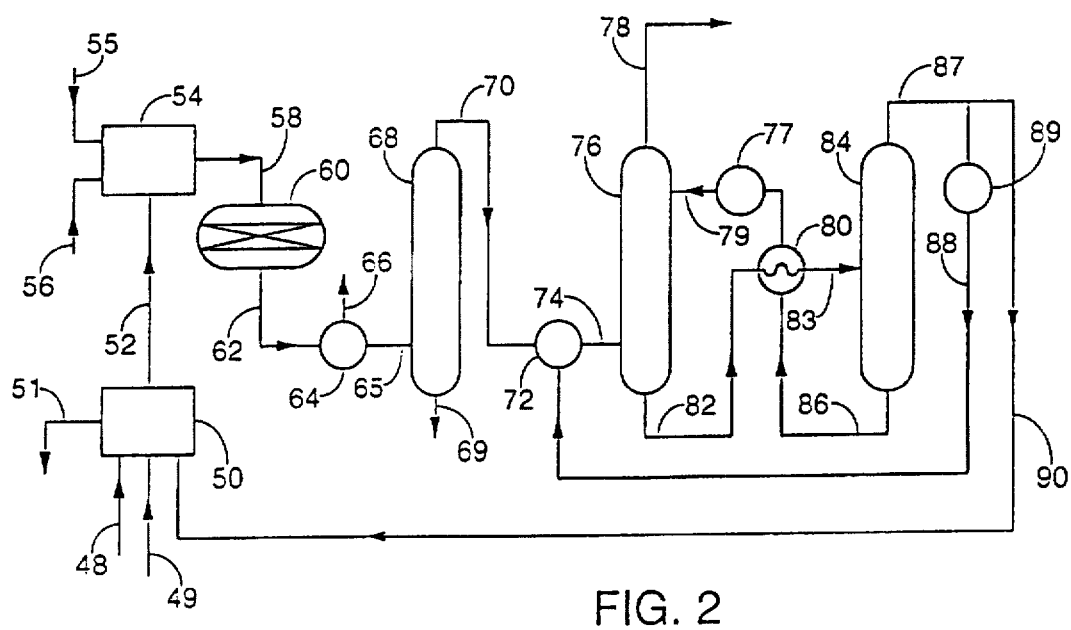
FIG. 2 shows a schematic of the present invention in a tail gas treatment application using a single absorber-regenerator cycle.

In FIG. 2, streams of acid gas 48, air 49 and recycled gas 90 are processed in sulfur recovery unit 50 which produces elemental sulfur 51 and emits tail gas stream 52. Hydrocarbon fuel gas 55 and air 56 are combined with tail gas 52 in reducing gas generator for sub-stochiometric combustion (as an alternative to reducing gas generator 54, tail gas stream 52 may be combined with a hydrogen rich refinery stream). Hot gas stream 58 is then discharged to hydrogenation/ hydrolysis reactor 60 where, in the presence of cobalt-molybdenum or another appropriate catalyst, sulfur dioxide and sulfur are hydrogenated to hydrogen sulfide while carbonyl sulfide and carbon disulfide are hydrolyzed to hydrogen sulfide and carbon dioxide.

The effluent gas stream 62 from reactor 60 then passes through boiler 64, generating waste low pressure steam 66, and continues as partially cooled gas stream 65 to quench column 68. In quench column 68, sour water stream 69 condenses out for further treatment and hydrogen sulfide bearing gas stream 70 is cooled for selective amine absorption.

Mixer 72 receives gas stream 70 and hydrogen sulfide enriched gas stream 88, feeding the combined gases 74 to absorber 76 with a partial pressure of hydrogen sulfide now significantly increased over that in stream 70. In absorber 76, hydrogen sulfide is absorbed by MDEA or another $H_2S$ selective solvent, the efficacy of this selective absorption being promoted by the elevated partial pressure of $H_2S$. Sweetened gas 78 is passed to an incinerator (unshown) for thermal decomposition and disposal. Hydrogen sulfide rich solvent stream 82 passes through heat exchanger 80, emerging as stream 83, at a higher temperature, for entry into regenerator In regenerator 84, the heated solvent gives up most of its absorbed gases which emerge as hydrogen sulfide rich overhead gas stream 87. The lean solvent stream 86, largely relieved of absorbed $H_2S$, is returned to absorber 76 as a lower temperature stream 79 after passing through heat exchanger 80 and cooler 77. Overhead gas stream 87 is divided, with recycle stream 88 passing through cooler 89 to be recycled, via mixer 72, in absorber 76 and the balance 90 being re-processed through sulfur recovery unit 50. Since the inlet pressures to sulfur recovery unit 50 and absorber 76 are substantially equal and somewhat lower than the upstream pressures, the flow rates of streams 88 and 90 may be governed by selective pipe sizing so that there is no need for valves or pumps.

Figure 3:
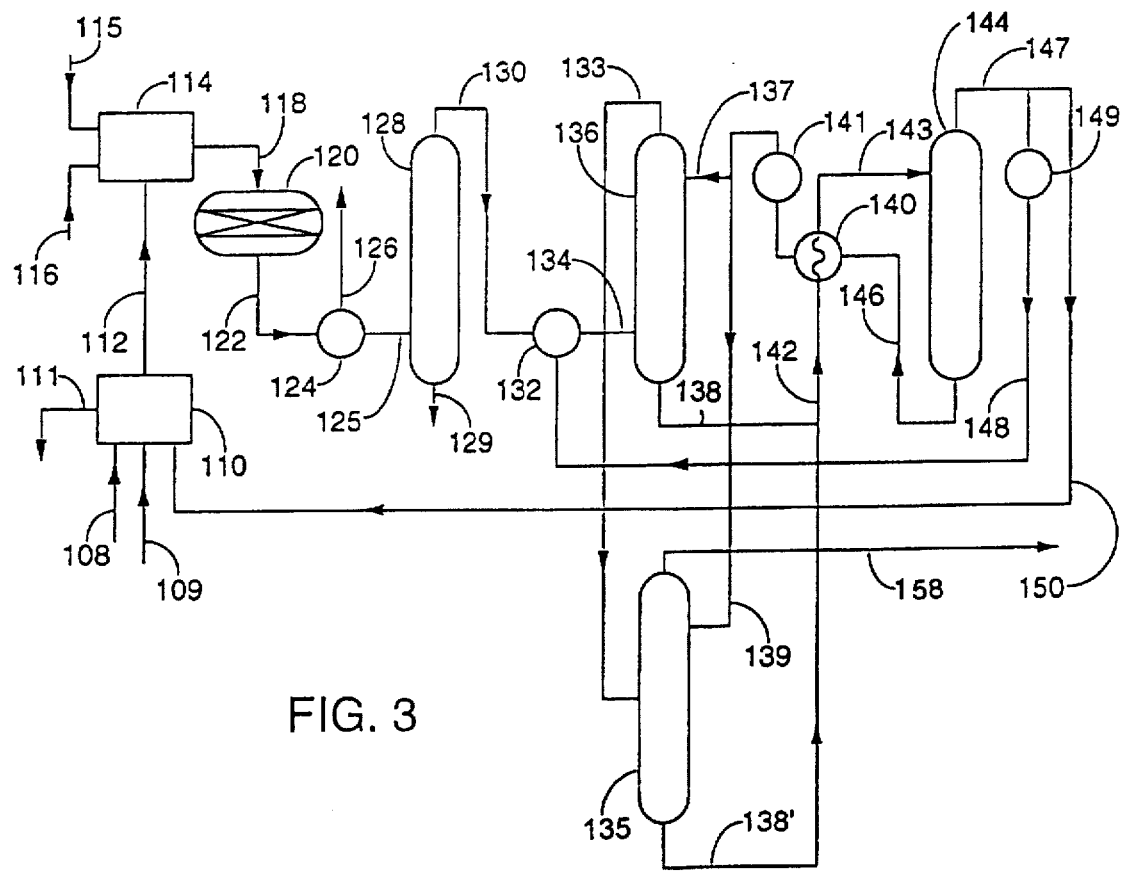
FIG. 3 shows a schematic of the present invention in a tail gas treatment application using a multiple absorber-regenerator cycle.

In FIG. 3, acid gas 108, air 109 and recycled gas 150 are processed in sulfur recovery unit 110 which produces elemental sulfur 111 and emits tail gas stream 112. Hydrocarbon fuel gas 115 and air 116 combine with tail gas 112 for sub-stoichiometric combustion in reducing gas generator 114. Hot gas stream 118 is discharged to hydrogenation/ hydrolysis reactor 120 where, in the presence of cobalt-molybdenum or another appropriate catalyst, sulfur dioxide and sulfur are hydrogenated to hydrogen sulfide while carbonyl sulfide and carbon disulfide are hydrolyzed to hydrogen sulfide and carbon dioxide.

The effluent gas stream 122 from reactor 120 then passes through boiler 124, generating waste low pressure steam 126, and continues as partially cooled gas stream 125 to quench column 128. Here, sour water stream 129 condenses out and hydrogen sulfide bearing gas stream 130 is cooled for selective amine absorption.

Mixer 132 receives gas stream 130 and $H_2S$ enriched gas stream 148, feeding the combined gases 134 to primary absorber 136 with its partial pressure of $H_2S$ now significantly increased over that in stream 130. In primary absorber 136, $H_2S$ is absorbed by MDEA or another $H_2S$ selective solvent, this selectivity being promoted by the elevated partial pressure of $H_2S$. Gas stream 133, with reduced $H_2S$ content after passing through primary absorber 136, is fed to secondary absorber 135. Sweetened gas 158 is passed to an incinerator (unshown) for final disposal. Hydrogen sulfide rich solvent streams 138 and 138' from primary and secondary absorbers 136 and 135 are combined as stream 142, pass through heat exchanger 140 and emerge as heated rich stream 143 to enter regenerator 144.

In regenerator 144, the absorbed gases are given up by the heated solvent to emerge as $H_2S$ rich overhead gas stream 147. The lean solvent stream 146, now largely relieved of absorbed $H_2S$, is returned to replenish the solvent supply in primary and secondary absorbers 135 and 136 as streams 137 & 139, after passing through heat exchanger 140 and cooler 141. Rich overhead gas stream 147 is divided, with a recycle stream 148 passing through cooler 149 and being reprocessed via mixer 132 to absorber 136 as previously described and the balance 150 being recycled through sulfur recovery unit 110.

Figure 4:
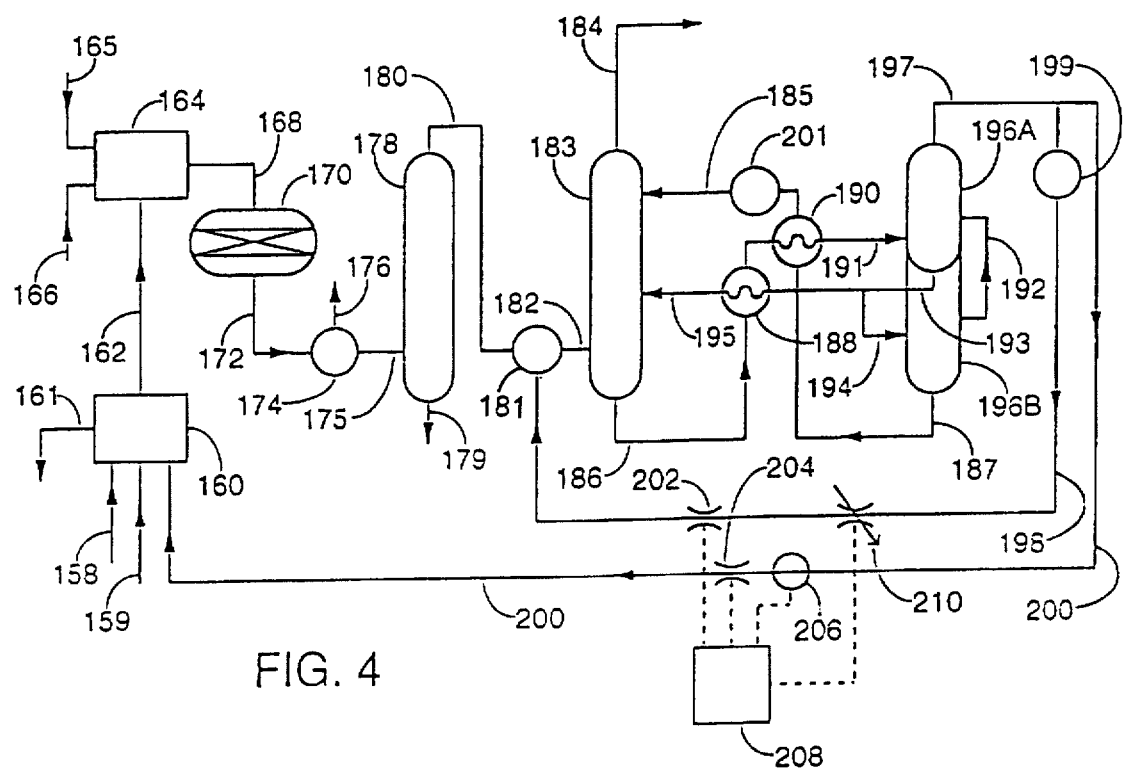
FIG. 4 shows a schematic of an application of the present invention to a Super-SCOT process.

FIG. 4 shows a Super-SCOT process as enhanced by the inclusion of the present invention. Here, acid gas 158, air 159 and recycled gas 200 are processed in sulfur recovery unit 160 which produces elemental sulfur 161 and emits tail gas stream 162. Hydrocarbon fuel gas 165 and air 166 combine with tail gas 162 for sub-stoichiometric combustion in reducing gas generator 164. Hot gas stream 168 is discharged to hydrogenation/hydrolysis reactor 170 where, in the presence of cobalt-molybdenum another appropriate catalyst, sulfur dioxide and sulfur are hydrogenated to hydrogen sulfide while carbonyl sulfide and carbon disulfide are hydrolyzed to hydrogen sulfide and carbon dioxide.

The effluent gas stream 172 from reactor 170 then passes through boiler 174, generating waste low pressure steam 176, and continues as partially cooled gas stream 175 to quench column 178. Sour water stream 179 condenses out and hydrogen sulfide bearing gas stream 180 is cooled for selective amine absorption.

Mixer 181 receives gas stream 180 and hydrogen sulfide enriched gas stream 198, feeding the combined gases 182 to absorber 183 with its partial pressure of hydrogen sulfide now significantly increased over that in stream 180. In absorber 183, hydrogen sulfide is absorbed by the $H_2S$ selective solvent and sweetened gas 184 is passed to an incinerator (unshown) for final disposal. Hydrogen sulfide rich solvent stream 186 from absorber 183 is passed through heat exchangers. 188 and 190 to emerge as heated stream 191 for entry into regenerator 196A.

In regenerator 196A, the heated solvent gives up its absorbed gases which emerge as overhead gas stream 197. Solvent stream 193, with a minor content of absorbed $H_2S$, is divided, with a portion 194 being passed to secondary regenerator section 196B and the balance, solvent stream 195, is cooled by its return through heat exchanger 188 as a cooled to be recycled in absorber 183. Most of the $H_2S$ remaining in solvent stream 194 is given up in secondary regenerator section 196B and migrates as stream 192 to primary regenerator section 196A to continue through and join into overhead gas stream 197. Super-lean solvent stream 187 from secondary regenerator 196B passes through heat exchanger 190 and cooler 201 for return to absorber 183 as super-lean stream 185. Overhead gas stream 197, rich in hydrogen sulfide, is divided with recycle stream 198 passing through cooler 199 to be recycled via mixer 181 to absorber 183 as previously described. The reining hydrogen sulfide rich stream 200 is re-processed in sulfur recovery unit 160.

The concentration of $H_2S$ in gas stream 200 varies with the percentage of stream 197 which is recycled as recycle stream 198. When the flow rate of stream 198 is initiated and gradually increased, the mass flow rate of stream 200 begins to decrease while maintaining a substantially constant mass flow rate of hydrogen sulfide ($H_2S$). At some point, this effect flattens out so that further increases of recycle stream 198 have no substantial effect on stream 200. The optimum recycle flow rate is determined by process controller 208. Flow meter 202 measures the volume flow rate of the recycle stream 198, while flowmeter 204 measures the volume flow rate of stream 200. $H_2S$ analyzer 206 measures the concentration of $H_2S$ in stream 200. The process controller 208 adjusts the flow rate of the recycle stream 198, using variable flow restriction 210, to obtain the smallest practical flow rate of recycle stream 198 while maintaining the desired mass flow rate of $H_2S$ in stream 200.

Figure 5:
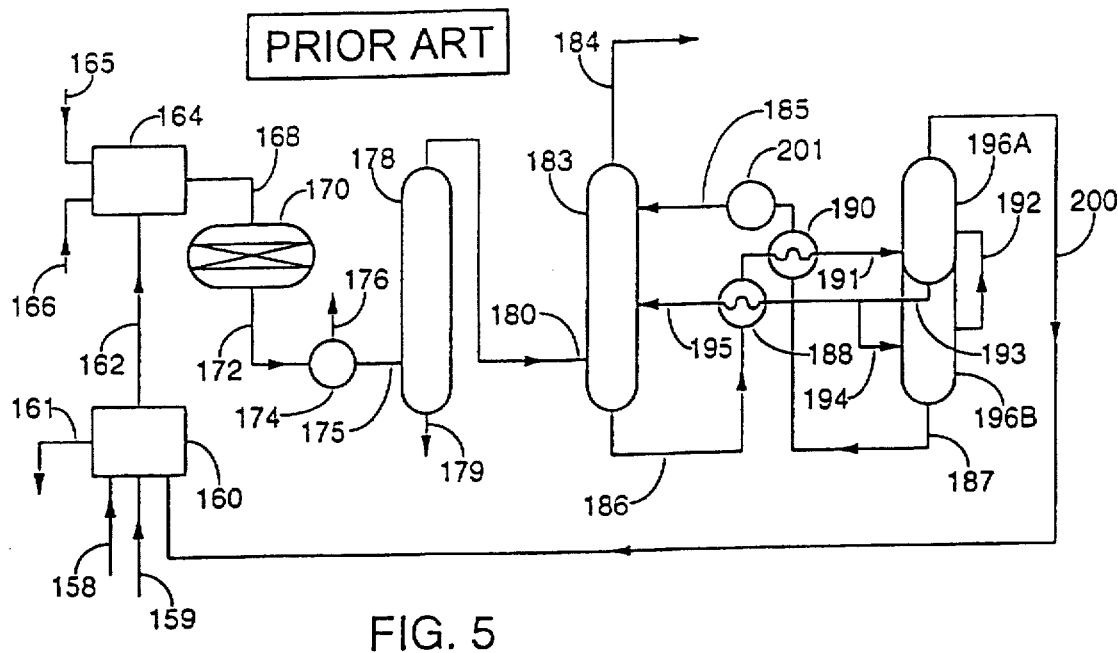
FIG. 5 shows a schematic of the same Super-SCOT process without the present invention.

FIG. 5 shows a conventional Super-SCOT process, identical to the showing of FIG. 4 in every respect except in not utilizing the present invention so that stream 200 is the undivided overhead gas from regenerator section 196A. Reference numbers for corresponding streams and components are the same for FIGS. 4 and 5 to facilitate comparison of stream content in the systems under like conditions. Assuming that the input acid gas 158 streams are the same for both systems at 264.2 lb.mols/hr, the tail gas streams 162 will be substantially equal. This substantial equality will prevail through streams 168, 172 and 180, to the entry of absorber 183. Sweetened gas 184 is also taken to be equal for both systems at some level in the 10 ppm range. The difference begins with the reprocessing of a portion of the regenerated overhead gas, stream 198, back to mixer 181 in the system of FIG. 4 to increase the partial pressure of $H_2S$ in absorber 183. This does not significantly alter the $H_2S$ content of recycle streams 200; FIG. 4 sys. @5.3 lb.mols/hr as compared to FIG. 5 sys. @5.5 lb.mols/hr, but greatly reduces the total mass flow in streams 200. In the system of FIG. 4, the total mass flow is 392.9 lbs/hr (10.7 lb.mols/hr) as compared to 685.8 lbs/hr (17.7 lb.mols/hr) for the system of FIG. 5. Increasing partial pressure of $H_2S$ for greater $H_2S$ selectivity in absorber 183 also causes a corresponding increase in the flow of unselected gas, mainly $CO_2$, in sweetened gas stream 184. Since sulfur recovery units are flow limited, the 292.9 lb. reduction of stream 200 allows unit 160 to accept an additional 292.9 lbs. in acid gas stream 158. The added acid gas flow capacity permits a proportional increase in sulfur removal and a corresponding increase in refinery production output.

It is to be understood that the present invention is not limited to the disclosed embodiments and may be expressed by rearrangement or modification or substitution of parts within the same spirit.

I claim:

1. Apparatus for removing a selected contaminate from a feed gas stream, wherein the apparatus consists essentially of:

an absorber for taking in the feed gas stream and a contaminate lean solvent stream, absorbing a selected contaminate from the feed gas stream, and discharging an unabsorbed gas stream and a contaminate rich solvent stream;

means for introducing the feed gas stream into the absorber;

regenerating means, receiving the contaminate rich solvent stream from the absorber, for regenerating the contaminate rich solvent stream, discharging a contaminate rich gas stream which is at least partially employed as a recycle stream, and a contaminate lean solvent stream;

means, connected to the regenerating means, for recycling the recycle stream to the means for introducing the feed gas stream into the absorber; and combining means, connected between the recycling means and the absorber, for combining the recycle stream with the feed gas stream so as to increase the partial pressure of the selected contaminate in the feed gas stream.

2. The apparatus of claim 1 wherein the combining means also mixes said recycled portion of the contaminate rich gas stream with said feed gas stream.

3. The apparatus of claim 1 further consisting essentially of means for recycling the contaminate lean solvent to join with said solvent in contact with said feed gas stream.

4. The apparatus of claim 1 further consisting essentially of a heat exchanger, connected between the absorber and the regenerating means, to cool said contaminate lean solvent stream and to heat said contaminate rich solvent stream.

5. Apparatus for the removal of sulfureous contaminates from a gas stream consisting essentially of:

a hydrogenation reactor for taking in the gas stream, converting the sulfureous contaminates to hydrogen sulfide, and discharging a second stream;

a cooler to cool said second stream, thereby condensing out an aqueous portion from the second stream;

a solvent that absorbs hydrogen sulfide;

means for contacting said second stream with said solvent so as to produce a sweetened gas stream and a hydrogen sulfide rich solvent stream;

means for heating said hydrogen sulfide rich solvent stream to produce a hydrogen sulfide rich third gas stream which is at least partially employed as a recycle stream, and a hydrogen sulfide lean solvent stream;

means for recycling the recycle stream to join said second stream; and a mixer to combine said second stream with the recycle stream so as to increase the partial pressure of hydrogen sulfide in said second stream.

6. Apparatus according to claim 5, wherein the hydrogen sulfide solvent is an organic amine.

7. Apparatus according to claim 5, wherein the hydrogen sulfide solvent is a physical absorbent.

8. Apparatus for removing at least one contaminate from a feed gas stream, wherein the apparatus comprises:

an absorber for taking in the feed gas stream and a contaminate lean solvent stream, absorbing at least one contaminate from the feed gas stream, and discharging an unabsorbed gas stream and a contaminate rich solvent stream;

means for introducing the feed gas stream into the absorber;

regenerating means, receiving the contaminate rich solvent stream from the absorber, for regenerating the contaminate rich solvent stream, discharging a contaminate rich gas stream and a contaminate lean solvent stream;

means, connected to the regenerating means, for recycling a portion of the contaminate rich gas stream to the means for introducing the feed gas stream into the absorber, leaving an unrecycled portion;

combining means, connected between the recycled portion of the contaminate rich gas stream and the absorber, for combining the recycled portion of the contaminate rich gas stream with the feed gas stream so as to increase the partial pressure of the absorbed contaminate in the feed gas stream;

means for measuring the rate of flow of said recycled portion of said contaminate rich gas stream;

means for measuring the rate of flow of said unrecycled portion of said contaminate rich gas stream;

means for measuring the concentration of said contaminate in said unrecycled portion; and means for controlling the flow rate of said recycled portion to achieve the smallest practical flow rate of said recycled portion while maintaining a substantially constant mass flow rate of said contaminate in said unrecycled portion of said contaminate rich gas stream.

9. Apparatus for the removal of sulfureous contaminates from a gas stream comprising:

a hydrogenation reactor for taking in the gas stream, converting the sulfureous contaminates to hydrogen sulfide, and discharging a second stream;

a cooler to cool said second stream thereby condensing out an aqueous portion from the second stream;

a mixer to combine said second stream with a hydrogen sulfide rich gas portion so as to increase the partial pressure of hydrogen sulfide in said second stream;

a solvent that absorbs hydrogen sulfide;

means for contacting said second stream with said solvent so as to produce a sweetened gas stream and a hydrogen sulfide rich solvent stream;

means for heating said hydrogen sulfide rich solvent stream to produce a hydrogen sulfide rich third gas stream and a hydrogen sulfide lean solvent stream;

means for recycling a portion of the third gas stream, leaving an unrecycled portion;

means for returning said recycled portion to said mixer;

means for measuring the rate of flow of said recycled portion;

means for measuring the rate of flow of said unrecycled portion;

means for measuring the concentration of hydrogen sulfide in said unrecycled portion; and means for controlling the flow rate of said recycled portion to achieve the smallest practical flow rate of said recycled portion while maintaining a substantially constant mass flow rate of said hydrogen sulfide in said unrecycled portion of said rich gas stream.

* * * * *